US008627119B2

United States Patent
Barnes et al.

(10) Patent No.: US 8,627,119 B2
(45) Date of Patent: Jan. 7, 2014

(54) SCRIPT ENGINE FOR CONTROL OF POWER MANAGEMENT CONTROLLERS

(75) Inventors: Mark Barnes, Stanton St. Quintin (GB); Chris Hobson, Swindon (GB)

(73) Assignee: Dialog Semiconductor GmbH., Kirchheim/Teck-Nabern (DE)

( * ) Notice: Subject to any disclaimer, the term of this patent is extended or adjusted under 35 U.S.C. 154(b) by 627 days.

(21) Appl. No.: 12/807,389

(22) Filed: Sep. 3, 2010

(65) Prior Publication Data

US 2012/0047382 A1    Feb. 23, 2012

(30) Foreign Application Priority Data

Aug. 23, 2010  (EP) .................................... 10368032

(51) Int. Cl.
G06F 1/00  (2006.01)
(52) U.S. Cl.
USPC ......................................................... 713/300
(58) Field of Classification Search
USPC ......................................................... 713/300
See application file for complete search history.

(56) References Cited

U.S. PATENT DOCUMENTS

| 4,881,219 | A  | * | 11/1989 | Jacquel | ............................ | 700/90 |
|---|---|---|---|---|---|---|
| 7,227,847 | B2 |  | 6/2007 | Gluck |  |  |
| 7,643,800 | B2 |  | 1/2010 | Rofougaran |  |  |
| 8,116,206 | B1 | * | 2/2012 | Dropps et al. | ................. | 370/238 |
| 2002/0124161 | A1 | * | 9/2002 | Moyer et al. | ................... | 712/234 |
| 2005/0240825 | A1 | * | 10/2005 | El-Batal | ............................ | 714/42 |
| 2007/0030281 | A1 |  | 2/2007 | Chen |  |  |
| 2007/0064454 | A1 | * | 3/2007 | Chen et al. | ....................... | 363/49 |
| 2007/0164715 | A1 | * | 7/2007 | Zeng et al. | ..................... | 323/268 |
| 2007/0229518 | A1 | * | 10/2007 | Kii et al. | ......................... | 345/520 |
| 2008/0046707 | A1 | * | 2/2008 | Hirai et al. | ......................... | 713/1 |
| 2008/0126655 | A1 | * | 5/2008 | Baier et al. | ..................... | 710/301 |
| 2008/0144086 | A1 | * | 6/2008 | Shibao | .......................... | 358/1.15 |
| 2009/0132835 | A1 |  | 5/2009 | Ehmann |  |  |
| 2010/0077087 | A1 | * | 3/2010 | Roy et al. | ....................... | 709/228 |
| 2010/0100711 | A1 | * | 4/2010 | Kaplan | .......................... | 712/208 |
| 2010/0145643 | A1 |  | 6/2010 | Katpelly et al. |  |  |

FOREIGN PATENT DOCUMENTS

EP    1 069 494    1/2001

OTHER PUBLICATIONS

European Search Report 10368032.8—1245, Mail date—Feb. 2, 2011, Dialog Semiconductor, GmbH.

* cited by examiner

*Primary Examiner* — Mohammed Rehman
(74) *Attorney, Agent, or Firm* — Saile Ackerman LLC; Stephen B. Ackerman

(57) ABSTRACT

A power management IC (PMIC) and methods thereof have been achieved wherein the PMIC invented supports multiple applications while having a high degree of flexibility and allowing a small built and a low power consumption. An embedded script engine on an internal communication bus of the PMIC replaces hard-wired sequencers and control interfaces or using processors as utilized in prior art. The script engine reads instructions from a non-volatile memory as e.g. a one-time programmable (OTP) memory. Furthermore a RAM can be provided to store executable instructions loaded from a host. Moreover a FIFO process is provided if instructions or TAGs are received while a previous script is being exercised. Any type of power supplies, output GPIO or other function could be controlled also by the Script Engine. The invention is also applicable to any other kind of power management circuits.

54 Claims, 2 Drawing Sheets

SCRIPT ENGINE FOR CONTROL OF POWER MANAGEMENT CONTROLLERS

BACKGROUND OF THE INVENTION (1) Field of the Invention

This invention relates generally to the field of Power Management Controllers and relates more specifically to script engines to replace hard-wired sequencers and control interfaces for power management integrated circuits (ICs) or other power management circuits.

(2) Description of the Prior Art

A Power Management IC (PMIC) is often used to control a number of supplies within an end device. The PMIC must switch these supplies on and off in a set order for the application to work correctly. A PMIC to support e.g. two known applications requires control logic to support both applications and often the requirements of both applications conflict. The only current solution is to add yet more configuration registers to select between features.

In regard of an open market product (application specific standard products—ASSP) as e.g. an PMIC, details of the signals or their timings are not known, which means very complex programmable interfaces are required to ensure that the PMIC is sufficiently flexible.

This causes the control logic extremely complicated to design. Often these added features result in undesired behavior in some modes, which requires exhaustive user-case testing, and there is no guarantee that all the end users requirements are met.

Different applications, and even powering up and down in some cases, can have conflicting requirements. With a traditional hard-wired approach these conflicts are difficult to identify before mounting on a board, and difficult to fix.

In order to support multiple applications with a single circuit a flexible approach consuming minimal power and being capable to be easily adapted should be achieved.

Using a microprocessor for this purpose would provide a flexible solution. The drawbacks of using a microprocessor are relative high power consumption, the amount of chip space required, and the requirement of a Software Development Kit for the processor.

Therefore other solutions are desirable combining high flexibility, low power consumption, and minimal chip size required.

Solutions dealing with power management controllers supporting multiple applications are described in following patents:

U.S. patent (U.S. Pat. No. 7,227,847 to Gluck) discloses an application based power management system comprising a power management application executed on a first device, wherein the power management application monitors communications interfaces for a plurality of applications in communication with one or more devices in a wireless environment, such that the power management application determines bandwidth and latency characteristics for each of the plurality of applications, and determines respective power management settings for each of the corresponding plurality of applications, wherein each respective power management setting optimizes data communicated by each of the applications in accordance with the corresponding bandwidth and latency characteristics.

U.S. patent application (U.S. Pat. No. 7,643,800 to Rofougaran) proposes a voice data and RF integrated circuit (IC) including a memory module that stores a least one application as a plurality of operational instructions, the at least one application having a plurality of power modes that each correspond to one of a plurality of use characteristics. A processing module executes the plurality of operational instructions, determines a selected one of the plurality of power modes based on current use characteristics of the at least one application, and generates a power mode signal based on the selected one of the plurality of power modes. An on-chip power management circuit receives the power mode signal and generates a plurality of power supply signals based on the power mode signal.

U.S. Patent Publication (US 2010/0145643 to Katpelly et al.) discloses a user-controlled application-based power management function provided for a battery-operated device. In general, for each of a number of applications of the battery-operated device, a power management function enables a user of the battery-operated device to provide a usage parameter for the application defining a desired amount of usage of the application for each of one or more tasks. For each task, the power management function determines an estimated amount of battery life that is sufficient to provide the desired amount of usage of the application for the task and determines whether the estimated amount of battery life is available. If the estimated amount of battery life is available, the power management function allocates an amount of battery life corresponding to the estimated amount of battery life to the application for the task.

SUMMARY OF THE INVENTION

A principal object of the present invention is to generate a simple reusable architecture for a power management IC (PMIC) supporting multiple applications.

A further object of the present invention is to use a Script Engine removing the need to hard-wire interfaces and control sequences for each application into a PMIC.

A further object of the present invention is to achieve a flexible solution for a PMIC.

A further object of the present invention is to simplify design, verification, and test of a PMIC.

A further object of the present invention is to enable field application engineers to develop customer specific products in a very short time.

A further object of the present invention is enable fast field upgrades of "hard-wired" functions.

Moreover an object of the present invention is to enable customers to develop "software functions" in hardware in order to simplify software.

Another object of the invention is to utilize the present invention for any kind of power management circuits.

In accordance with the objects of this invention a method to achieve a PMIC supporting multiple applications having a high degree of flexibility and allowing a small built and low power consumption has been disclosed. The method invented comprises the steps of (1) providing a PMIC supporting multiple applications, comprising an internal communication bus that is connected to a number of power supplies, to a number of general purpose input/output (GPI/O) devices, and to a non volatile memory, and (2) deploying a script engine on an internal communication bus of the PMIC, wherein the script engine controls said power supplies.

In accordance with the objects of this invention a PMIC supporting multiple applications having a high degree of flexibility and allowing a small built and a low power consumption has been achieved. The PMIC invented comprises, firstly: an internal communication bus, connecting an interface to a host system, a bus manager, and a script engine. Furthermore the internal communication bus connects a non-volatile memory, a number of power supplies, and a number of general-purpose input/out (GPIO) devices.

In accordance with the objects of this invention a method to achieve a power management circuit supporting multiple applications having a high degree of flexibility and allowing a small built and low power consumption has been disclosed. The method invented comprises the steps of (1) providing a power management circuit supporting multiple applications, comprising an internal communication bus that is connected to a number of power supplies, to a number of general purpose input/output (GPI/O) devices, and to a non volatile memory, and (2) deploying a script engine on an internal communication bus of the PMIC, wherein the script engine controls said power supplies.

In accordance with the objects of this invention a power management circuit supporting multiple applications having a high degree of flexibility and allowing a small built and a low power consumption has been achieved. The power management circuit invented comprises, firstly: an internal communication bus, connecting an interface to a host system, a bus manager, and a script engine. Furthermore the internal communication bus connects a non-volatile memory, a number of power supplies, and a number of general-purpose input/out (GPIO) devices.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present invention disclose power management integrated circuits (PMIC) and methods thereof supporting multiple applications wherein a script engine controls the operation of the PMIC. The Script Engine removes the need to hard-wire interfaces and control sequences for each application into a PMIC. This creates a simple reusable architecture.

It should be noted that the present invention is applicable not only to PMICs but also to any other power management circuits.

The Script Engine can be programmed to have quite different behavior for each application and powering up/down simply by pointing to different scripts. The only other solution this flexible could be to embed a microprocessor. However the Script Engine approach is much smaller, consumes less power (due to required clock speed and number of cycles required per instruction of a microprocessor), and does not require a Software Development Kit for the processor.

Figure 1:
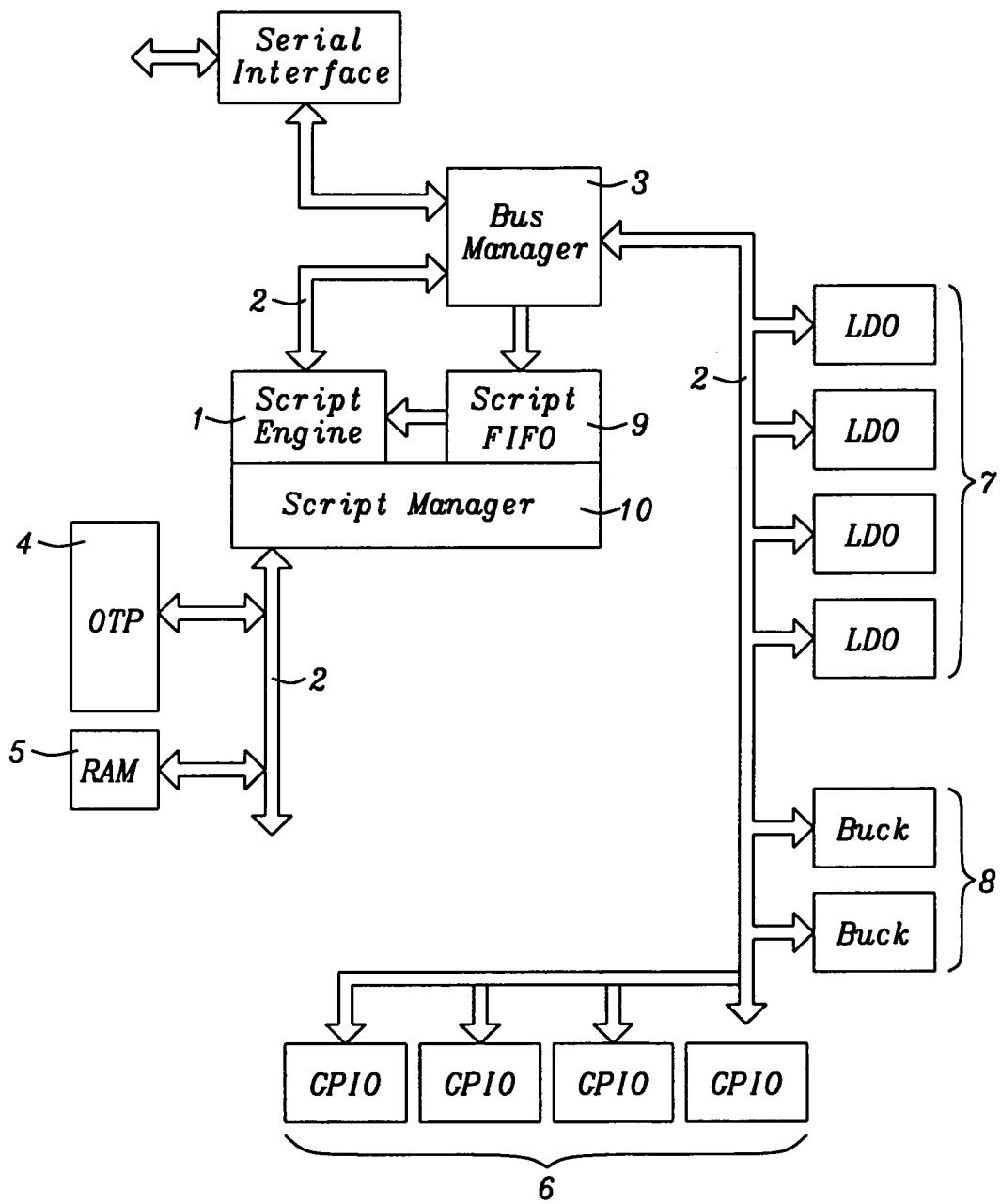
FIG. 1 illustrates a block diagram of an embodiment of the PMIC 100 of the present invention.

FIG. 1 illustrates a block diagram of an embodiment of the PMIC 100 of the present invention. The Script Engine 1 is located on the PMICs internal communication bus 2. The internal communication bus is controlled by bus manager 3. It has access in the preferred embodiment to an embedded One Time Programmable (OTP) memory 4, and a small RAM 5. It should be noted that alternatively any type of non-volatile memory could be used instead of the OTP memory 4. Furthermore any number of General Input/Output (GPIO) ports 6 can be connected to the bus 2. Moreover any number of DC-to-DC converters, such as low drop-out (LDO) converters 7 or buck converters 8 can be connected to the bus 2 as shown in FIG. 1. It should be noted any other kind of DC-to-DC converters, such as boost converters, buck/boost converters, etc. could also be connected to the bus 2.

When powered up, the Script Engine 1 reads the contents of a first OTP address. The OTP could be e.g. a programmable read-only memory (PROM). The script engine 1 reads the data at this address and decodes it e.g. as an internal address and data, a delay step, or an instruction. If the data is an internal address, it is sent out on the internal communication bus 2. Then the next OTP address is read and the cycle repeats until an End-Of-Script (EOS) code is detected. By always reading the first OTP address, this set of instructions can be used to initially configure the PMIC. If no configuration is required, then this address can be set to EOS.

Once active, a Host can write via a serial interface 11 to an address in the Script Engine 1, it is taken as a start address in the OTP, and is processed as described above. So the host can initiate any number of scripts held in OTP to enable sequences of operations.

The script manager block 10 handles fault conditions and contention. It also prioritizes instructions.

When an EOS is detected the script engine 1 shuts down until another script access is made.

The PMIC is required to start/shutdown supplies when an input signal is detected. The PMIC can be controlled by Serial Bus or by Input Pins to change state.

To facilitate this, each General Input/Output (GPIO) input can be given an active and inactive "TAG" which is an address for the Script Engine. When the input changes state, the appropriate TAG is sent to the Script Engine 1, and contents of the OTP 4 at the TAG are processed by the Script Engine 1. By having two TAGs, the PMIC can behave in one way when the signal goes active and a different way when the signal goes inactive. In this way input pins of the GPIOs 6 can behave in the same way as Host accesses.

For instance when one of the input GPIOs 6 goes high, the TAG could start a script that enables a Buck converter 8, waits e.g. 128 uS, then enables e.g. three LDOs 7 and toggles a GPIO output to indicate it has finished.

When the signal later goes low, the other TAG could start a script that enables e.g. a backup battery, then switches off e.g. the LDOs 7, waits e.g. 32 uS, then switches off the Buck converter 8 and toggles a GPIO twice.

This sort of flexibility, which is an important part of the present invention, is simpler to implement and verify than hard wiring interfaces for all known applications.

The PMIC 100, shown in FIG. 1, forms a basic structure and is easily to be extended. For instance OTP data can also be identified as instructions such as wait, etc.

Clearly the embodiment of the PMIC of the present invention described above would process a script before giving control back to the next TAG of Host instruction. The Script engine 1 would also have to be able to abandon a script if a serious problem occurred such as over temperature or a catastrophic drop in Voltage. Another consequence of the serial processing is that another instruction or TAG could be received while the previous script is being exercised. This requires a short first-in-first-out (FIFO) memory operation of block 9 to store TAGs so that they are not lost or missed.

So far the Script engine has been assumed to run from an OTP 4 and this or some form of non-volatile memory is required to start up a system before the Host is active. However an OTP provides a fixed functionality once the PMIC is programmed and mounted in an end Application. By adding a small RAM 5, the Host can write to the RAM 5 and so add to the instructions that can be executed. This could form the basis for field upgrades.

Un-programmed OTP memory bits are usually set to 1, and once programmed are fixed as 0 and cannot be reset. This leads to many PMIC devices being thrown away if the programming needs to be changed.

It should be noted that any type of power supplies, output GPIO or other function could be controlled also by the Script Engine.

To aid script development, the Script Engine 1 of the present invention can skip un-programmed entries in a script, and instructions marked as skip (by setting all bits in the instruction to 0). So during development the Engineer can leave spaces after any instruction. If the instruction is incorrect he can set all its bits to be skipped and put the new instruction in the next space. This is an important contribution to the flexibility of the PMIC of the present invention.

Figure 2:
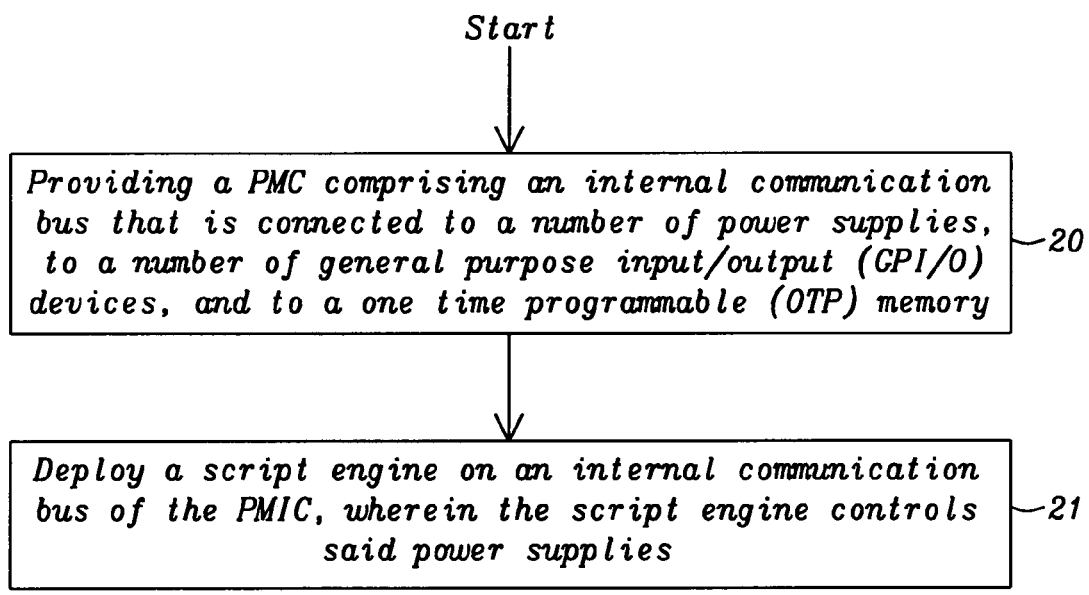
FIG. 2 illustrates a flowchart of a method to achieve a PMIC supporting multiple applications

FIG. 2 illustrates a flowchart of a method to achieve a PMIC supporting multiple applications having a high degree of flexibility and allowing a small built and low power consumption. A first step 20 describes the provision of a PMIC supporting multiple applications, comprising an internal communication bus that is connected to a number of power supplies, to a number of general purpose input/output (GPI/O) devices, and to a one time programmable (OTP) memory. Alternatively any kind of non-volatile memory could be deployed as well. Step 21 illustrates deploying a script engine on an internal communication bus of the PMIC, wherein the script engine controls said power supplies.

While the invention has been particularly shown and described with reference to the preferred embodiments thereof, it will be understood by those skilled in the art that various changes in form and details may be made without departing from the spirit and scope of the invention.

What is claimed is:

1. A method to achieve a Power Management Integrated Circuit (PMIC) supporting multiple applications having a high degree of flexibility and allowing a small built and low power consumption comprising the steps of
   (1) providing a PMIC supporting multiple applications, comprising an internal communication bus that is connected to a number of power supplies, to a number of general purpose input/output (GPI/O) devices, and to a non-volatile memory configured to be used to start-up the PMIC wherein the content of the non-volatile memory comprises internal addresses, internal data, delay steps, and instructions; and
   (2) deploying a script engine located on an internal communication bus of the PMIC, wherein the script engine controls said power supplies.

2. The method of claim 1 wherein said power supplies comprise any types of DC-to-DC converters.

3. The method of claim 1 wherein, when powered up, the script engine reads a content of a first address of the non-volatile memory and decodes it.

4. The method of claim 3 wherein, if said content is an internal address, following steps are performed:
   (3) sending out said address to the internal communication bus; and
   (4) reading the content of the next address of the non-volatile memory address, decoding it and, if this content is an internal address go to step (3) until an end-of-script (EOS) signal is detected.

5. The method of claim 4 wherein the script engine shuts down when an EOS is detected until another access is made.

6. The method of claim 1 wherein each of said GPIOs can be given an active and inactive TAG and when an input changes state an appropriate TAG is sent to the script engine and contents of the non-volatile memory at the TAG address are processed by the script engine.

7. The method of claim 1 wherein non-volatile memory data can also be identified as one or more instructions.

8. The method of claim 1 wherein said non-volatile memory is a one time programmable (OTP) memory.

9. The method of claim 1 wherein the script engine processes a script before giving control back to a next TAG of Host instruction.

10. The method of claim 1 wherein the script engine is able to abandon a script if a serious problem occurs with supplying power.

11. The method of claim 1 wherein a first-in first-out FIFO memory is provided to store TAGs in case an instruction or TAGs are received while a previous script is being exercised.

12. The method of claim 1 wherein in order to aid script development the script engine can skip un-programmed entries in a script hence allowing to leave spaces after any instructions.

13. The method of claim 1 wherein un-programmed bits of the non-volatile memory are set to "1".

14. The method of claim 1 wherein the script engine can skip instructions marked as skip, which is defined by setting all bits in the instructions to "0".

15. The method of claim 1 wherein a host is connected to the PMIC.

16. The method of claim 15 wherein said host is connected via a serial interface.

17. The method of claim 15 wherein a random access memory (RAM) is provided wherein a host can write instructions to said RAM in order to add instructions which can be executed.

18. The method of claim 1 wherein any type of power supplies, output GPIO or other function could be controlled also by the Script Engine.

19. A Power Management Integrated Circuit) PMIC supporting multiple applications having a high degree of flexibility and allowing a small built and a low power consumption comprising:
   an internal communication bus, connecting:
      an interface to a host system;
      a bus manager;
      a script engine located on the internal communication bus of the PMIC, wherein the script engine controls a number of power supplies;
      a non-volatile memory configured to be used to start-up the PMIC wherein the content of the non-volatile memory comprises internal addresses, internal data, delay steps, and instructions;
      said number of power supplies; and
      a number of general-purpose input/out (GPIO) devices.

20. The PMIC of claim 19 wherein said interface to the host is a serial interface.

21. The PMIC of claim 19 wherein a script FIFO memory is connected to the script engine and to the bus manager, wherein the script FIFO memory stores instructions or TAGS received while a previous script is executed.

22. The PMIC of claim 19 wherein a Script Manager block prioritizes instructions.

23. The PMIC of claim 19 wherein a Script Manager block handles fault conditions and contention.

24. The PMIC of claim 19 wherein said number of power supplies comprises buck converters.

25. The PMIC of claim 19 wherein said number of power supplies comprises low drop-out (LDO) converters.

26. The PMIC of claim 19 wherein the internal communication bus is also connected to a random access memory (RAM) in order to store instructions to be added after the PMIC has been already programmed.

27. The PMIC of claim 19 wherein said non-volatile memory is a one-time-programmable memory.

28. A method to achieve a power management circuit supporting multiple applications having a high degree of flexibility and allowing a small built and low power consumption comprising the steps of
(1) providing a power management circuit, comprising an internal communication bus that is connected to a number of power supplies, to a number of general purpose input/output (GPI/O) devices, and to a non-volatile memory configured to be used to start-up the power management circuit wherein the content of the non-volatile memory comprises internal addresses, internal data, delay steps, and instructions; and
(2) deploying a script engine located on an internal communication bus of the power management circuit, wherein the script engine controls said power supplies.

29. The method of claim 28 wherein said power supplies comprise any types of DC-to-DC converters.

30. The method of claim 28 wherein, when powered up, the script engine reads a content of a first address of the non-volatile memory and decodes it.

31. The method of claim 30 wherein, if said content is an internal address, following steps are performed:
(3) sending out said address to the internal communication bus; and
(4) reading the content of the next address of the non-volatile memory address, decoding it and, if this content is an internal address go to step (3) until an end-of-script (EOS) signal is detected.

32. The method of claim 31 wherein the script engine shuts down when an EOS is detected until another access is made.

33. The method of claim 28 wherein each of said GPIOs can be given an active and inactive TAG and when an input changes state an appropriate TAG is sent to the script engine and contents of the non-volatile memory at the TAG address are processed by the script engine.

34. The method of claim 28 wherein non-volatile memory data can also be identified as one or more instructions.

35. The method of claim 28 wherein said non-volatile memory is a one time programmable (OTP) memory.

36. The method of claim 28 wherein the script engine processes a script before giving control back to a next TAG of Host instruction.

37. The method of claim 28 wherein the script engine is able to abandon a script if a serious problem occurs with supplying power.

38. The method of claim 28 wherein a first-in first-out FIFO memory is provided to store TAGs in case an instruction or TAGs are received while a previous script is being exercised.

39. The method of claim 28 wherein in order to aid script development the script engine can skip un-programmed entries in a script hence allowing to leave spaces after any instructions.

40. The method of claim 28 wherein un-programmed bits of the non-volatile memory are set to "1".

41. The method of claim 28 wherein the script engine can skip instructions marked as skip, which is defined by setting all bits in the instructions to "0".

42. The method of claim 28 wherein a host is connected to the power management circuit.

43. The method of claim 42 wherein said host is connected via a serial interface.

44. The method of claim 42 wherein a random access memory (RAM) is provided wherein a host can write instructions to said RAM in order to add instructions which can be executed.

45. The method of claim 28 wherein any type of power supplies, output GPIO or other function could be controlled also by the Script Engine.

46. A power management circuit supporting multiple applications having a high degree of flexibility and allowing a small built and a low power consumption comprising:
an internal communication bus, connecting:
an interface to a host system;
a bus manager;
a script engine located on the internal communication bus of the PMIC, wherein the script engine controls a number of power supplies;
a non-volatile memory configured to be used to start-up the power management circuit wherein the content of the non-volatile memory comprises internal addresses, internal data, delay steps, and instructions;
said number of power supplies; and
a number of general-purpose input/out (GPIO) devices.

47. The power management circuit of claim 46 wherein said interface to the host is a serial interface.

48. The power management circuit of claim 46 wherein a script FIFO memory is connected to the script engine and to the bus manager, wherein the script FIFO memory stores instructions or TAGS received while a previous script is executed.

49. The power management circuit of claim 46 wherein a Script Manager block prioritizes instructions.

50. The power management circuit of claim 46 wherein a Script Manager block handles fault conditions and contention.

51. The power management circuit of claim 46 wherein said number of power supplies comprises buck converters.

52. The power management circuit of claim 46 wherein said number of power supplies comprises LDO converters.

53. The power management circuit of claim 46 wherein the internal communication bus is also connected to a random access memory (RAM) in order to store instructions to be added after the PMIC has been already programmed.

54. The power management circuit of claim 46 wherein said non-volatile memory is a one-time-programmable memory.

* * * * *